US012761648B2

(12) United States Patent
Aharpour

(10) Patent No.: US 12,761,648 B2
(45) Date of Patent: Oct. 13, 2026

(54) SYSTEM AND METHOD OF REDUCING ENERGY CONSUMPTION OF DATALOGGER DEVICES MONITORING ACCELEROMETERS TRACKING CHANGES OF LOCATION

(71) Applicant: Arash Aharpour, Vancouver (CA)

(72) Inventor: Arash Aharpour, Vancouver (CA)

( * ) Notice: Subject to any disclaimer, the term of this patent is extended or adjusted under 35 U.S.C. 154(b) by 326 days.

(21) Appl. No.: 18/243,622

(22) Filed: Sep. 7, 2023

(65) Prior Publication Data

US 2025/0085705 A1 Mar. 13, 2025

(51) Int. Cl.

| | |
|---|---|
| ***G05D 1/00*** | (2024.01) |
| ***G06F 3/0346*** | (2013.01) |
| ***G06F 11/07*** | (2006.01) |
| ***G08B 25/01*** | (2006.01) |
| ***G08B 25/10*** | (2006.01) |
| ***H04L 9/40*** | (2022.01) |

(52) U.S. Cl.

CPC ......... *G05D 1/0094* (2013.01); *G06F 3/0346* (2013.01); *G06F 11/0709* (2013.01); *G06F 11/0769* (2013.01); *G06F 11/0781* (2013.01); *G08B 25/016* (2013.01); *G08B 25/10* (2013.01); *H04L 63/1416* (2013.01)

(58) Field of Classification Search

CPC ............. G06F 11/0709; G06F 11/0769; G06F 11/0781; G08B 25/016; G08B 25/10; H04L 63/1416

See application file for complete search history.

(56) References Cited

U.S. PATENT DOCUMENTS

| | | | | |
|---|---|---|---|---|
| 9,177,282 | B2 * | 11/2015 | Stevens | G06Q 10/08 |
| 11,455,877 | B2 * | 9/2022 | Aharpour | G08B 29/04 |
| 12,056,653 | B1 * | 8/2024 | Hockin | H04W 4/027 |
| 2017/0316182 | A1 * | 11/2017 | Blackadar | A61B 5/0024 |

* cited by examiner

*Primary Examiner* — John A Tweel, Jr.

(57) ABSTRACT

A system for monitoring movement and location of assets is provided comprising an accelerometer affixed to an observed asset, a datalogger device in communication with the accelerometer, and an algorithm stored in the datalogger device. The system comprises an application stored in the datalogger device that based on a predetermined sampling schedule, activates the accelerometer. The system makes a first observation that the accelerometer is in moving mode, moving mode indicating that the asset is presently in motion. The system activates a motion state and transmits an immediate update to a server. The system also maintains sampling at the predetermined schedule while continuing to monitor location of the asset. The system also shortens an interval for server updates from a non-moving state interval to a moving state interval in accordance with a first directive from the algorithm. The system also reports detected location of the asset to the server.

20 Claims, 2 Drawing Sheets

| Current Activity | Previous Activity | Condition / Sync Status | Time passed from last sync (t) | Unsuccessful Sync Counter (103) | What to do |
|---|---|---|---|---|---|
| Any | Any | Sync Failed | - | Increment | Add 1 to Counter (103) |
| Any | Any | Sync Successful | - | Reset to 0 | Clear Counter (103) |
| Any | Any | - | SIS <=t | < Limit | Sync Now |
| Still | Still | - | SIS>t | - | Go back to sleep |
| Moving | Still | - | t=>SIM | < Limit | Sync Now |
| Moving | Still | - | t=<SIM | - | Go back to sleep |
| Still | Moving | - | t=>SIM | < Limit | Sync Now |
| Still | Moving | - | t=<SIM | - | Go back to sleep |
| Moving | Moving | - | t=>SIM | < Limit | Sync Now |
| Moving | Moving | - | t=<SIM | - | Go back to sleep |
| Any | Any | Counter >= Limit | - | >= Limit | Extend interval to SIS (to save battery) |

FIG. 2

SYSTEM AND METHOD OF REDUCING ENERGY CONSUMPTION OF DATALOGGER DEVICES MONITORING ACCELEROMETERS TRACKING CHANGES OF LOCATION

CROSS REFERENCE TO RELATED APPLICATIONS

None

FIELD OF THE DISCLOSURE

The present disclosure is in the field of monitoring sensors for assets and reporting location. More particularly, the present disclosure provides dataloggers that sample accelerometers attached to monitored assets, where updates to servers regarding monitoring observations vary based on the results of the monitoring, with the objective of conserving datalogger battery capacity.

BACKGROUND

Many datalogger devices that monitor sensors are located far from power sources such as standard wall outlets or power from vehicle. Dataloggers must therefore rely on battery power which is short lived and unpredictable regarding date of exhaustion. Products in the market do focus on battery life but they reduce reporting rates to preserve battery life. Batteries typically must be manually checked and replaced, a labor intensive and costly process. Not all batteries last to the end of their published useful lives. Conserving battery life is therefore important to secure monitored assets and protect asset owners and others from liability. Conserving battery life is discussed in U.S. Pat. No. 11,455,877 to Aharpour dated Sep. 27, 2022, entitled "System and Method of Reducing Energy Consumption of Datalogger Devices While Maintaining High Sampling Rate and Real Time Alarm Function."

BRIEF DESCRIPTION OF THE FIGURES

FIG. 2 is a table describing an algorithm of the datalogger according to an embodiment of the present disclosure.

DETAILED DESCRIPTION

Figure 1:
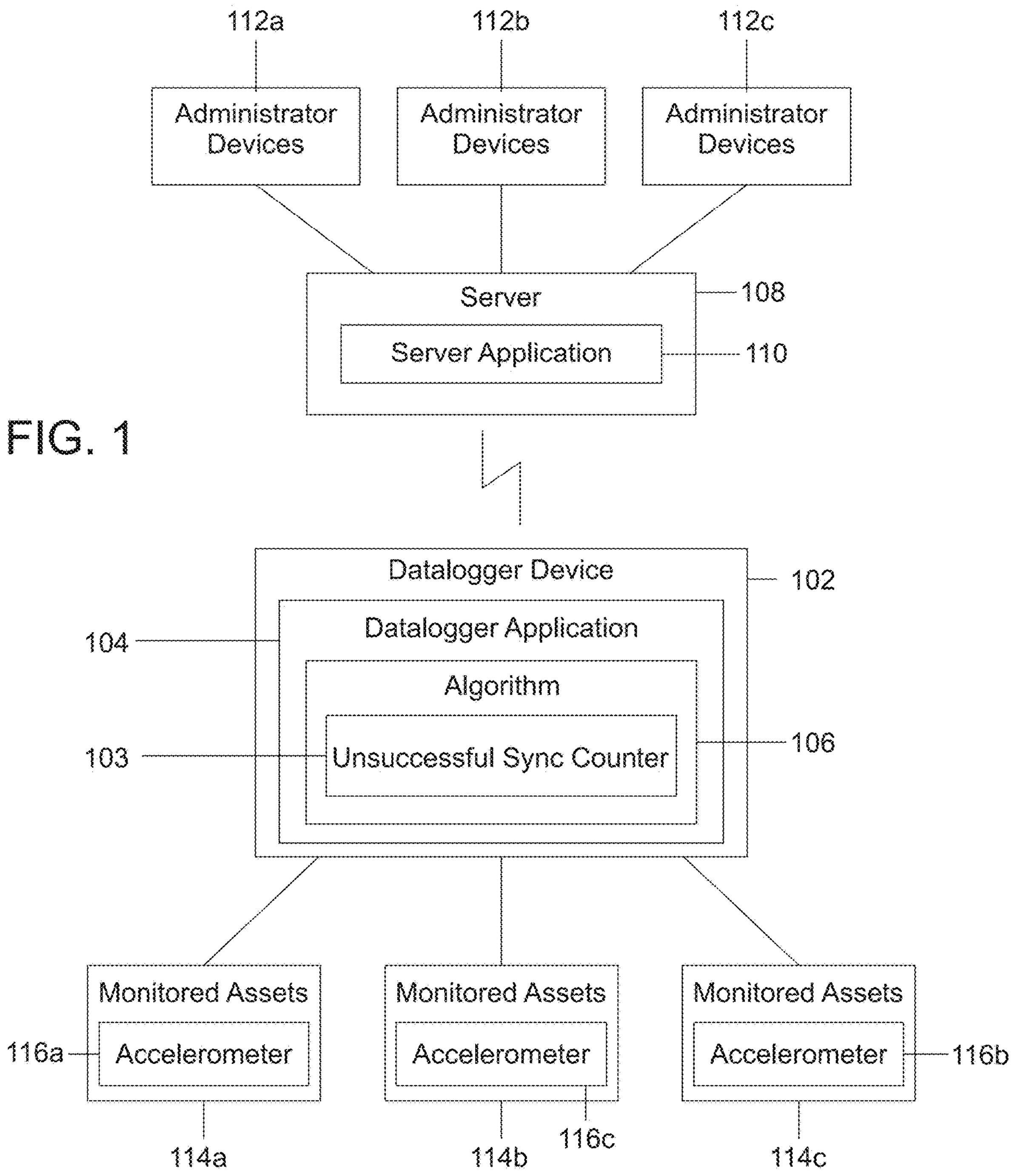
FIG. 1 is a block diagram of a system of reducing energy consumption of datalogger devices monitoring accelerometers while maintaining alarm function according to an embodiment of the present disclosure.

Systems and methods described herein provide a datalogger device in communication with an accelerometer that is attached to an asset whose movement and location are to be monitored. The datalogger frequently contacts the accelerometer for sampling to determine if the asset is stationary or in motion. The datalogger sends wireless updates at various intervals to a server advising of asset status. When the asset is observed to be in motion, the datalogger shortens the interval between server synchronization updates while still sampling at a same frequent rate as previously. The datalogger maintains the shortened server update interval until the asset is detected to be no longer moving or perhaps moving at a slower speed. Sampling uses less battery power than transmission of server updates. Configuring for frequent sampling but less frequent updates may conserve battery capacity while maintaining safe levels of observed systems. An application executing on the datalogger is configured, with results from algorithm processing, to alter the update interval should a motion condition be observed. Based on detection of motion and means of transport by the accelerometer, the application may shorten the update interval such that the server or other recipient of updates receives updates more frequently depending on the mode of transport than during non-motion times. The shortened update interval may continue until underlying causes of detected motion are addressed and the situation is cleared or until an authorized party overrides the shortened update interval.

The server that receives the updates may communicate with administrative devices used by parties who may investigate reasons why the asset is being moved. Based on policies associated with the increased frequency of received server updates to location of asset, and nature and value of the asset, users of the administrative devices or other parties may investigate or take other actions such as instructing the datalogger to shorten its update interval even further on a temporary basis. Steps may be taken to secure further information about the location of the asset and the direction in which the asset is being moved and who is in control of the asset.

When the datalogger device wakes up for recording based on sampling interval, it activates the accelerometer and uses the accelerometer's activity detection to monitor ongoing movement of a monitored asset. The datalogger records the activity in its internal memory so it knows what activity is presently taking place and what the previous activity status was in terms of the monitored asset being stationary or in motion. The datalogger may make decisions about reporting the in-motion or still status and current geographic location based on at least one algorithm executing on the datalogger. The datalogger device has two modes: "moving mode" and "still mode". In "moving mode" the system shortens the interval of location reporting (syncing) while in "still mode" the datalogger implements longer intervals between updates to the server. Within moving mode, fast or slow speed of movement may be observable and reportable. Server reporting intervals are adjusted accordingly. Faster detected movements would call for increasing shortened intervals as described herein.

When the asset and its attached accelerometer are detected to be stationary or in still mode, the datalogger device continues to frequently sample the accelerometer but extends the server update interval as still mode indicates a non-moving state. Sampling the accelerometer does not heavily tax the datalogger's battery. By contrast, the datalogger initiating a wireless session with a typically remote server does consume significant battery capacity. Limiting server updates only to a frequency that is necessary conserves battery capacity of the datalogger while reporting the updated actual location of the asset of the monitored asset.

Systems and methods provided herein are predicated on the fact that many datalogger devices are not attached to a permanent power source such as a typical wall outlet or vehicle power.

Because activity sampling uses less battery power than transmission of server updates, configuring for frequent sampling but less frequent updates until motion is detected conserves battery capacity while maintaining safe levels of security for monitored assets.

Turning to the figures, FIG. 1 depicts components and interactions of a system 100 of reducing energy consumption of datalogger devices monitoring accelerometer-attached assets while maintaining high sampling rate and real time alarm function. The system 100 comprises a datalogger device 102, a datalogger application 104, an algorithm 106, a server 108, and a server application 110.

The system 100 also comprises administrator devices 112*a*, 112*b*, 112*c*, monitored assets 114*a*, 114*b*, 114*c*, and accelerometers 116*a*, 116*b*, 116*c*. The datalogger application 104 may be referred to hereinafter for brevity as the application 104. The datalogger device 102 may be referred to hereinafter for brevity as the datalogger 102 or the device 102. While quantity three each of administrator devices 112*a*, 112*b*, 112*c*, monitored assets 114*a*, 114*b*, 114*c* and accelerometers 116*a*, 116*b*, 116*c* are depicted in FIG. 1 and provided by the system 100, in embodiments more than or less than quantity three each of such components may be provided. Administrator devices 112*a-c* may for example be smartphones or laptop computers. Monitored assets 114*a-c* may for example be shipping containers that remain stationary for extended periods but are also transported on ships, for example.

The datalogger device 102 is an electronic device that records data over time or in relation to location either with a built-in instrument or sensor or via external instruments and sensors. In the present disclosure, the datalogger device 102 is monitoring the actions of accelerometers 116*a*, 116*b*, 116*c* attached to monitored assets 114*a*, 114*b*, 114*c*. Datalogger devices 102 are generally small, battery powered, portable, and equipped with a microprocessor, internal memory for data storage, and sensors. Some datalogger devices 102 interact with a personal computer and use software to activate the datalogger devices 102 and view and analyze the collected data. Other datalogger devices 102, have a local interface device such as a keypad or LCD and may be used as a standalone device. Cloud-based dataloggers 102 use Wifi, 3G, LTE, LTE-M, 5G to upload the data to a server through the internet. Access to data captured and transmitted by dataloggers 102 is possible through the internet and a website (web-based application) or client application. Data can be retrieved, and settings can be changed through internet-enabled devices such as phones or computers through web-based or client applications executing on administrator devices 112*a*, 112*b*, 112*c*.

The datalogger application 104 executes at least partially on the datalogger device 102 and periodically polls or samples accelerometers 116*a*, 116*b*, 116*c* for movement. Sampling interval as provided herein is a time interval between drawing samples. In an embodiment, the application 104 may conduct sampling at an interval of once per minute, such that the maximum delay or time lag for a movement of accelerometers 116*a*, 116*b*, 116*c* to be detected is 59 seconds in the embodiment. The interval is adjustable and could be as short as a few milliseconds or several hours, depending on user settings. The application 104 transmits updates to the server 108 at an update interval which may be shortened slightly or considerably by the application 104 based on observed motion of the accelerometer.

When the datalogger 102 detects from sampling the accelerometer 116*a-c* that a monitored asset 114*a-c* is moving, the datalogger 102 may invoke or have already invoked activity detection functionality on the accelerometer 116*a-c*. This functionality enables the datalogger 102 to determine that the asset in in fast moving mode or slow-moving mode.

"Activity detection" is a function of accelerometers 116*a-c* that determines if a monitored asset 114*a-c* is moving or is still. If the monitored asset 114*a-c* is moving, the accelerometer 116*a-c* can determine the means of transport. For example, the accelerometer 116*a-c* can tell if a person who is carrying the accelerometer 116*a-c* is walking, running, or cycling, or if the monitored asset 114*a-c* is on a vehicle or ship. Activity detection determines the activity based on movement patterns without connection to a satellite or by using global positioning system (GPS). For activity detection, the system can turn on the accelerometer 116*a-c* for a brief period during the reading. Its energy consumption is low, and it can be turned off once activity is read.

When a monitored asset 114*a-c* is determined to be in fast-moving mode, the server update interval may be reduced or shortened to every fifteen minutes, for example. Means of transportation may be important because the system needs to reduce synchronization interval if the motion is detected to be fast.

When a monitored asset 114*a-c* is determined to be in slow-moving mode, the update interval may be reduced to every hour.

When detected to be in still mode when a monitored asset 114*a-c* is stationary, the server update interval may be every twenty-four hours. A large steel storage shipping container remaining stationary among hundreds or thousands of such units professionally stacked in a large secure seaport, rail yard, or trucking depot is unlikely to be suddenly moved or subjected to unplanned disturbance.

The activities described herein of the datalogger 102 tracking an accelerometer 116*a-c* attached to a monitored asset 114*a-c* may be independent of the datalogger 102 monitoring other types of sensors. A monitored asset 114*a-c* may be situated at a location that is monitored for temperature, for example. The datalogger 102 may sample a temperature sensor near or attached to the monitored asset 114*a-c* at predetermined sampling intervals separate from and independent of its sampling of an accelerometer 116*a-c* associated with the same monitored asset 114*a-c*. Likewise the datalogger 102 may institute and follow a different server update interval schedule for the temperature sensor as compared to the server update interval schedule for the accelerometer 116*a-c*.

The algorithm 106 and the datalogger application 104 work in conjunction with the server application 110 executing on the server 108 to orchestrate various schedules for sampling sensors, including accelerometers 116*a-c*, at various intervals, and implement synchronizations or updates of the server 108 at various intervals depending on observed conditions. The server application 110 processes information received from multiple sensors, for example accelerometers 116*a-c* and temperature sensors, and determines and implements actions to secure monitored asset 114*a-c* based on the received information and application of software tools at its disposal. Such actions include contacting administrator devices 112*a-c* and communicating instructions back to the datalogger application 104 to implement temporary or permanent changes to the algorithm 106 that directs actions of the datalogger 102. The server application 110 and the datalogger application 104 have the capacity to communicate bidirectionally and asynchronously.

When the datalogger 102 detects motion and sends repeated server updates wherein no acknowledgment is received back from the server 108, the datalogger 102 may after a predetermined number of failed updates discontinue sending updates or extend the update interval to that of still status. This may occur if the datalogger 102 is outside of wireless transmission range of the server 102, for example when the datalogger 102 is on a ship sailing across an ocean. In this instance, the datalogger 102 may increment the unsuccessful sync counter 103 and continue its usual frequent sampling of the accelerometer 116*a-c* and the extended update until it reaches a port where wireless communication with the server 108 may be restored. If motion is still being detected, the datalogger 102 may resume the shortened update interval indicating potential problem. If motion is no longer being detected, the datalogger 102 may maintain the extended interval associated with still or stationary status. In these types of situations, the algorithm 106 may provide guidance.

FIG. 2 depicts an algorithm of the datalogger 102 wherein SIS is Syncing interval in Still mode and SIM is Syncing interval in Moving mode. In most embodiments SIM is shorter than SIS.

In an embodiment, a system for monitoring movement and location of assets is provided comprising an accelerometer affixed to an observed asset, a datalogger device in communication with the accelerometer, and an algorithm stored in the datalogger device. The system also comprises an application stored in the datalogger device that based on a predetermined sampling schedule, activates the accelerometer. The system also makes a first observation that the accelerometer is in moving mode, moving mode indicating that the asset is presently in motion. The system also activates a motion state and transmits an immediate update to a server. The system also maintains sampling at the predetermined schedule while continuing to monitor location of the asset. The system also shortens an interval for server updates from a non-moving state interval to a moving state interval in accordance with a first directive from the algorithm. The system also reports detected location of the asset to the server in accordance with the first directive. The system also makes a second observation that the accelerometer is presently in still mode, still mode indicating that the asset is not in motion, and reports once more that still state is detected. The system also restores the interval for server updates from the moving state interval to the non-moving state interval in accordance with second directive from the algorithm.

The algorithm determines the first directive and the second directive based at least on characteristics of the observed moving mode. The characteristics comprise at least one of speed and agitation of the accelerometer.

The directives are based at least on observations before the first observation, the previous observations noting at least one of moving mode and still mode and levels of speed and agitation. The server makes determinations regarding forwarding alerts to a client device in possession of personnel associated with security of the observed asset.

The application implements changes in addition to algorithm directives based on instructions received from the server. Actions of the algorithm in implementing changes during moving states are directed to at least conserving battery capacity of the datalogger device. The system sends an update upon detection of movement beginning and reporting location when the observed asset discontinues moving and immediately prior to transition to still mode.

In another embodiment, a method of monitoring movement of an asset via attached accelerometer is provided. The method comprises a datalogger device, based on a predetermined sampling schedule, activating an accelerometer attached to an asset. The method also comprises the device implementing activity detection functionality of the accelerometer. The method also comprises the device making a first observation that the accelerometer is in moving mode, moving mode indicating that the asset is presently in motion. The method also comprises the device making a second observation that the accelerometer in motion is in a fast-moving mode. The method also comprises the device, based on the observations, reducing an update interval for server updates about mode to a first interval while maintaining the predetermined sampling schedule. The method also comprises the device making a third observation that the accelerometer is no longer in moving mode. The method also comprises the device, based on the third observation, extending the update interval to a second interval as directed for still mode.

The method also comprises the device invoking a locally executing application that transmits messages providing the server updates. The method also comprises the device making the observations and implementing changes to update intervals in accordance with at least one algorithm accessible via the application.

The method also comprises the device alternatively making the second observation that the accelerometer is in slow moving mode. The method also comprises the device reducing the update interval to a third interval while maintaining the predetermined sampling schedule.

In an example, the first interval associated with fast moving mode is every fifteen minutes, wherein the second interval associated with still mode is every twenty-four hours, and wherein the third interval associated with slow moving mode is every hour. Fast-moving mode is associated with the asset and attached accelerometer being transported by a one of a motor vehicle and a ship and slow-moving mode is being transported by one of a pedestrian and a bicycle.

In yet another embodiment, a method of conserving battery power of a datalogger device monitoring an accelerometer is provided. The method comprises a datalogger device, based on a predetermined sampling schedule, activating an accelerometer affixed to an observed asset. The method also comprises the device making a first observation that the accelerometer is in moving mode, moving mode indicating that the asset is presently in motion. The method also comprises the device activating a motion state based on the moving mode and based thereon initiating an update transmission to a server, the update transmission communicating the motion state. The method also comprises the device implementing a shortened interval for server update transmissions based on the motion state, the shortened interval shorter than a standard interval for still mode associated with the accelerator not moving.

The method also comprises the device receiving a first message that the update transmission failed. The method also comprises the device incrementing an unsuccessful sync counter from 0 to 1. The method also comprises the device, after observing a predetermined quantity of consecutive failed update transmissions and accompanying increments with each failure, extending the interval for update transmissions to the standard interval while maintaining the predetermined schedule for sampling. The method also comprises the device, upon receiving a second message that an update transmission was successful, continuing sampling at the predetermined schedule. The method also comprises the device one of resuming the shortened interval upon detecting continuance of motion state and returning to the standard interval upon detecting discontinuance of the motion state.

The method also comprises the asset and the device having been placed aboard a ship prior to receiving the first message. The method also comprises the device having moved beyond wireless communication range prior to receiving the first message.

Extending the interval after observing a predetermined quantity of consecutive failed update transmissions is directed to conserving battery capacity of the datalogger device in sending update transmissions while beyond wireless communication range. The method also comprises the device additionally monitoring sensors for conditions not detectable by the accelerometer, wherein server update intervals for such conditions are separate and unrelated to server update interval for conditions detectable by the accelerometer.

What is claimed is:

1. A system for monitoring movement and location of assets, comprising:
an accelerometer affixed to an observed asset;
a datalogger device in communication with the accelerometer;
an algorithm stored in the datalogger device; and
an application stored in the datalogger device that:
based on a predetermined sampling schedule, activates the accelerometer,
makes a first observation that the accelerometer is in moving mode, moving mode indicating that the asset is presently in motion,
activates a motion state and transmits an immediate update to a server;
maintains sampling at the predetermined schedule while continuing to monitor location of the asset,
shortens an interval for server updates from a non-moving state interval to an moving state interval in accordance with a first directive from the algorithm,
reports detected location of the asset to the server in accordance with the first directive,
makes a second observation that the accelerometer is presently in still mode, still mode indicating that the asset is not in motion, and reports once more that still state is detected,
restores the interval for server updates from the moving state interval to the non-moving state interval in accordance with a second directive from the algorithm.

2. The system of claim 1, wherein the algorithm determines the first directive and the second directive based at least on characteristics of the observed moving mode.

3. The system of claim 2, wherein the characteristics comprise at least one of speed and agitation of the accelerometer.

4. The system of claim 1, wherein the directives are based at least on observations previous to the first observation, the previous observations noting at least one of moving mode and still mode and levels of speed and agitation.

5. The system of claim 1, wherein the server makes determinations regarding forwarding alerts to a client device in possession of personnel associated with security of the observed asset.

6. The system of claim 1, wherein the application implements changes in addition to algorithm directives based on instructions received from the server.

7. The system of claim 1, wherein actions of the algorithm in implementing changes during moving states are directed to at least conserving battery capacity of the datalogger device.

8. The system of claim 1, wherein the system sends an update upon detection of movement beginning and reporting location when the observed asset discontinues moving and immediately prior to transition to still mode.

9. A method of monitoring movement of an asset via attached accelerometer, comprising:
a datalogger device, based on a predetermined sampling schedule, activating an accelerometer attached to an asset;
the device implementing activity detection functionality of the accelerometer;
the device making a first observation that the accelerometer is in moving mode, moving mode indicating that the asset is presently in motion;
the device making a second observation that the accelerometer in motion is in a fast-moving mode;
the device, based on the observations, reducing an update interval for server updates about mode to a first interval while maintaining the predetermined sampling schedule;
the device making a third observation that the accelerometer is no longer in moving mode; and
the device, based on the third observation, extending the update interval to a second interval as directed for still mode.

10. The method of claim 9, further comprising the device invoking a locally executing application that transmits messages providing the server updates.

11. The method of claim 10, further comprising the device making the observations and implementing changes to update intervals in accordance with at least one algorithm accessible via the application.

12. The method of claim 9, further comprising the device alternatively making the second observation that the accelerometer is in slow moving mode.

13. The method of claim 12, further comprising the device reducing the update interval to a third interval while maintaining the predetermined sampling schedule.

14. The method of claim 9, wherein the first interval associated with fast moving mode is every fifteen minutes, wherein the second interval associated with still mode is every twenty-four hours, and wherein the third interval associated with slow moving mode is every hour.

15. The method of claim 14, wherein fast-moving mode is associated with the asset and attached accelerometer being transported by a one of a motor vehicle and a ship and wherein slow-moving mode is being transported by one of a pedestrian and a bicycle.

16. A method of conserving battery power of a datalogger device monitoring an accelerometer, comprising:
a datalogger device, based on a predetermined sampling schedule, activating an accelerometer affixed to an observed asset;
the device making a first observation that the accelerometer is in moving mode, moving mode indicating that the asset is presently in motion;
the device activating a motion state based on the moving mode and based thereon initiating an update transmission to a server, the update transmission communicating the motion state;
the device implementing a shortened interval for server update transmissions based on the motion state, the shortened interval shorter than a standard interval for still mode associated with the accelerator not moving;
the device receiving a first message that the update transmission failed;
the device incrementing an Unsuccessful Sync Counter from 0 to 1;
the device, after observing a predetermined quantity of consecutive failed update transmissions and accompanying increments with each failure, extending the interval for update transmissions to the standard interval while maintaining the predetermined schedule for sampling;
the device, upon receiving a second message that an update transmission was successful, continuing sampling at the predetermined schedule, and one of resuming the shortened interval upon detecting continuance of motion state and returning to the standard interval upon detecting discontinuance of the motion state.

17. The method of claim 16, further comprising the asset and the device having been placed aboard a ship prior to receiving the first message.

18. The method of claim 16, further comprising the device having moved beyond wireless communication range prior to receiving the first message.

19. The method of claim 16, wherein extending the interval after observing a predetermined quantity of consecutive failed update transmissions is directed to conserving battery capacity of the datalogger device in sending update transmissions while beyond wireless communication range.

20. The method of claim 16, further comprising the device additionally monitoring sensors for conditions not detectable by the accelerometer, wherein server update intervals for such conditions are separate and unrelated to server update interval for conditions detectable by the accelerometer.

* * * * *